United States Patent
Kavoussi et al.

(10) Patent No.: US 10,085,198 B2
(45) Date of Patent: Sep. 25, 2018

(54) SYSTEM AND METHOD FOR SWITCHING ACCESS NETWORK CONNECTIVITY BASED ON APPLICATION THRESHOLDS AND SERVICE PREFERENCES

(71) Applicant: Verizon Patent and Licensing Inc., Arlington, VA (US)

(72) Inventors: Kavon T. Kavoussi, New York, NY (US); Sidharth R. Sibal, Basking Ridge, NJ (US); Anil Kumar Khitolia, Flanders, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 13 days.

(21) Appl. No.: 15/378,708

(22) Filed: Dec. 14, 2016

(65) Prior Publication Data

US 2018/0167861 A1  Jun. 14, 2018

(51) Int. Cl.
*H04W 36/00* (2009.01)
*H04W 36/30* (2009.01)
*H04W 36/14* (2009.01)
*H04L 12/859* (2013.01)
*H04W 4/24* (2018.01)
(Continued)

(52) U.S. Cl.
CPC ......... *H04W 36/30* (2013.01); *H04L 47/2475* (2013.01); *H04W 4/24* (2013.01); *H04W 36/14* (2013.01); *H04W 84/042* (2013.01); *H04W 84/12* (2013.01)

(58) Field of Classification Search
CPC .......... H04B 1/00; H04B 1/38; H04B 5/0031; H04B 5/0025; H04W 36/0083; H04W 36/0077; H04W 52/38; H04W 52/325; H04W 52/32; H04W 28/18; H04W 48/20; H04W 36/18; H04W 52/18; H04W 36/245; H04W 76/00; H04W 4/008; H04W 76/04; H04W 76/046; H04W 76/02; H04W 8/005; H04L 5/0005; H04L 5/0003; H04L 5/0007
See application file for complete search history.

(56) References Cited

U.S. PATENT DOCUMENTS

| | | | |
|---|---|---|---|
| 2010/0304737 A1* | 12/2010 | Jain ................... | H04W 36/0066 455/426.1 |
| 2012/0064908 A1* | 3/2012 | Fox ....................... | H04W 28/10 455/452.2 |

(Continued)

OTHER PUBLICATIONS

Project Fi, "Welcome to Project Fi, a wireless service from Google," https://fi.google.com/about/, Oct. 11, 2016, 6 pages.

(Continued)

*Primary Examiner* — Jung Liu

(57) ABSTRACT

A user device may receive information that identifies a service preference for the user device. The user device may determine an application threshold based on an application that is being executed by the user device. The user device may determine first network metric values associated with a cellular network, and determine second network metric values associated with a wireless local area network. The user device may automatically switch connectivity, of the user device, between the cellular network and the wireless local area network based on the service preference, the application threshold, the first network metric values, and the second network metric values.

20 Claims, 11 Drawing Sheets

(51) Int. Cl.
   *H04W 84/04*     (2009.01)
   *H04W 84/12*     (2009.01)

(56) References Cited

U.S. PATENT DOCUMENTS

| | | | | |
|---|---|---|---|---|
| 2012/0230305 A1* | 9/2012 | Barbu | H04W 48/20 | 370/338 |
| 2012/0315905 A1* | 12/2012 | Zhu | H04W 36/36 | 455/436 |
| 2013/0095789 A1* | 4/2013 | Keevill | H04W 12/06 | 455/411 |
| 2014/0079022 A1* | 3/2014 | Wang | H04W 36/22 | 370/331 |
| 2015/0038140 A1* | 2/2015 | Kilpatrick, II | H04W 64/00 | 455/436 |

OTHER PUBLICATIONS

Republic Wireless, "Adaptive Coverage," https://republicwireless.com/adaptive-coverage/, Apr. 21, 2016, 3 pages.
Wikipedia, "FreedomPop," https://en.wikipedia.org/wiki/FreedomPop, Mar. 7, 2017, 6 pages.

* cited by examiner

SYSTEM AND METHOD FOR SWITCHING ACCESS NETWORK CONNECTIVITY BASED ON APPLICATION THRESHOLDS AND SERVICE PREFERENCES

BACKGROUND

A user device (e.g., a smart phone) may connect to various access networks, such as cellular networks, wireless local area networks (WLANs), or the like, to enable functionality associated with applications (e.g., text messaging applications, social media applications, web browsing applications, etc.). Based on a set of input variables, the user device may switch access network connectivity to the various access networks.

DETAILED DESCRIPTION OF PREFERRED EMBODIMENTS

Figure 1A:
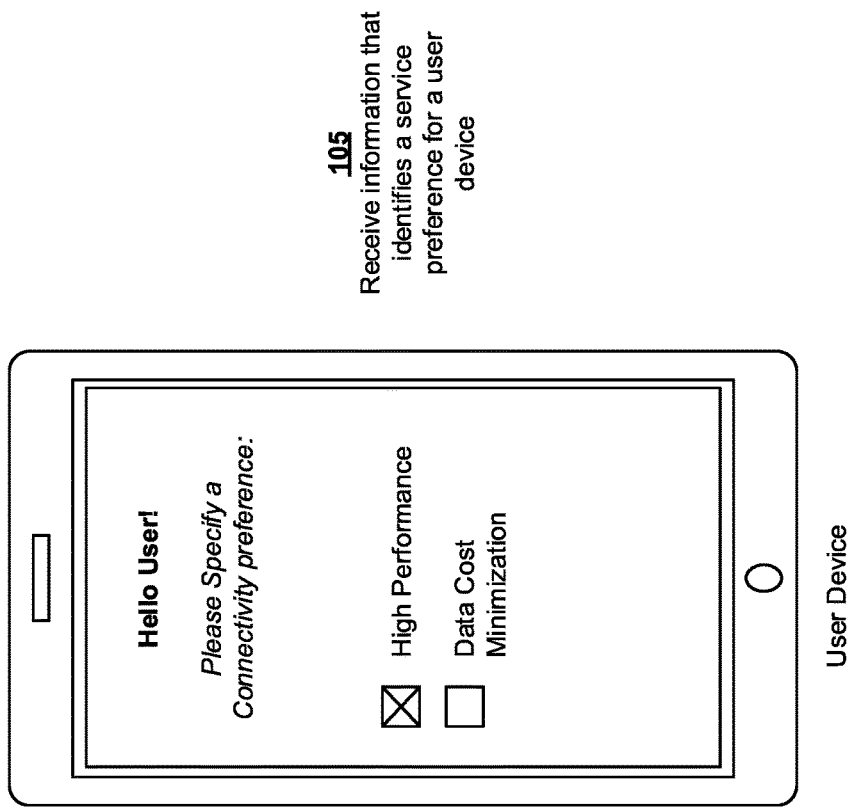
FIGS. 1A-1F are diagrams of an overview of an example implementation described herein.

The following detailed description of example implementations refers to the accompanying drawings. The same reference numbers in different drawings may identify the same or similar elements.

A user device may connect to an access network based on a user input. That is, a user may manually configure the user device to connect to a cellular network, a WLAN, or another type of access network. Based on the configuration, the user device may remain connected to the access network regardless of the availability of other networks or of a network metric value associated with the access network (e.g., a network metric value, such as a signal quality value, a throughput value, a latency value, or the like), and/or a network metric value associated with another access network that is available for connectivity (e.g., a greater signal quality value, a lower latency value, etc. than as compared to the access network).

In other cases, the user device may detect that a network metric value associated with an access network satisfies a threshold, and switch connectivity to another access network. However, the user device may switch connectivity to another access network that is associated with a worse network metric value than as compared to the access network from which the user device is switching connectivity, the user device may connect to an access network that is not a user preferred network, or the like. In such cases, processor and/or memory resources may be consumed based on the user device switching connectivity or staying connected to an access network that is associated with network metric values that result in communication issues (e.g., packet losses, delay, service interruptions, etc.), that is not a user preferred network (e.g., may require the user to manually switch connectivity), or the like.

Implementations described herein enable a user device to receive service preference information. In some implementations, the user device may receive the service preference information based on a user input (e.g., a user interaction with the user device), based on receiving information associated with a user account (e.g., from another device), or the like.

For example, service preference information may include information that identifies a preference (e.g., a user preference, a manufacturer preference, a network operator preference, etc.) for particular network metric values that result in a particular user experience, a user preference for connectivity to a particular access network, a user preference for data cost minimization, and/or the like. Additionally, implementations described herein enable the user device to determine an application threshold associated with an application that is being executed by the user device. For example, an application threshold may identify threshold network metric values for operation of the application. As used herein, operation of the application may refer to operation of the application without communication issues, with reduced communication issues, with appropriate use of network resources, etc.

Additionally, implementations described herein enable the user device to determine network metric values associated with multiple access networks that are available for connectivity (e.g., cellular networks, WLANs, etc.), and connect to a particular access network based on particular network metric values, the service preference information, and/or various thresholds. In this way, the user device may automatically provide optimum connectivity to an access network that is associated with particular network metric values (e.g., that satisfy the application threshold, that satisfy other network metric values of other networks, or the like), that is associated with a preference of the user, and/or the like.

In this way, implementations described herein reduce communication issues and eliminate the need for manual switching of access network connectivity, thereby conserving processor and/or memory resources of the user device and/or network resources. For example, implementations described herein enable a user device to automatically switch access network connectivity based on a set of input variables (e.g., thereby eliminating a need for manual switching), and enable the user device to automatically connect to an access network that is associated with the strongest signal quality values (e.g., as compared to other available access networks), thereby reducing communication issues (e.g., packet loss, latency, etc.) as compared to situations where the user device connects to another access network that is associated with lower signal quality values (e.g., that are prone to packet loss, high latency, etc.).

FIGS. 1A-1F are diagrams of an overview of an example implementation 100 described herein. As shown in FIG. 1A, example implementation 100 may include a user device (e.g., a smart phone). As shown by reference number 105, the user device may receive information that identifies a service preference for the user device. For example, the user device may provide, for display via a user interface, information that enables a user to select a service preference. In some implementations, the user device may provide, for display, a set of available service preferences that may include titles, such as "High Performance," "Data Cost Minimization," "Best Available Signal," "Wi-Fi Preferred," "Signal Optimizer," "Home Network Preferred," etc. In this case, as shown, the user may select "High Performance," which may indicate a user preference for connectivity to an access network that is associated with the greatest network metric values (e.g., as compared to other available access networks). Alternatively, the user may select a different service preference (e.g., "Data Cost Minimization"). In that case, the service preference may identify a user preference for connectivity to an access network that may not be associated with the incurrence of data charges.

Figure 1B:
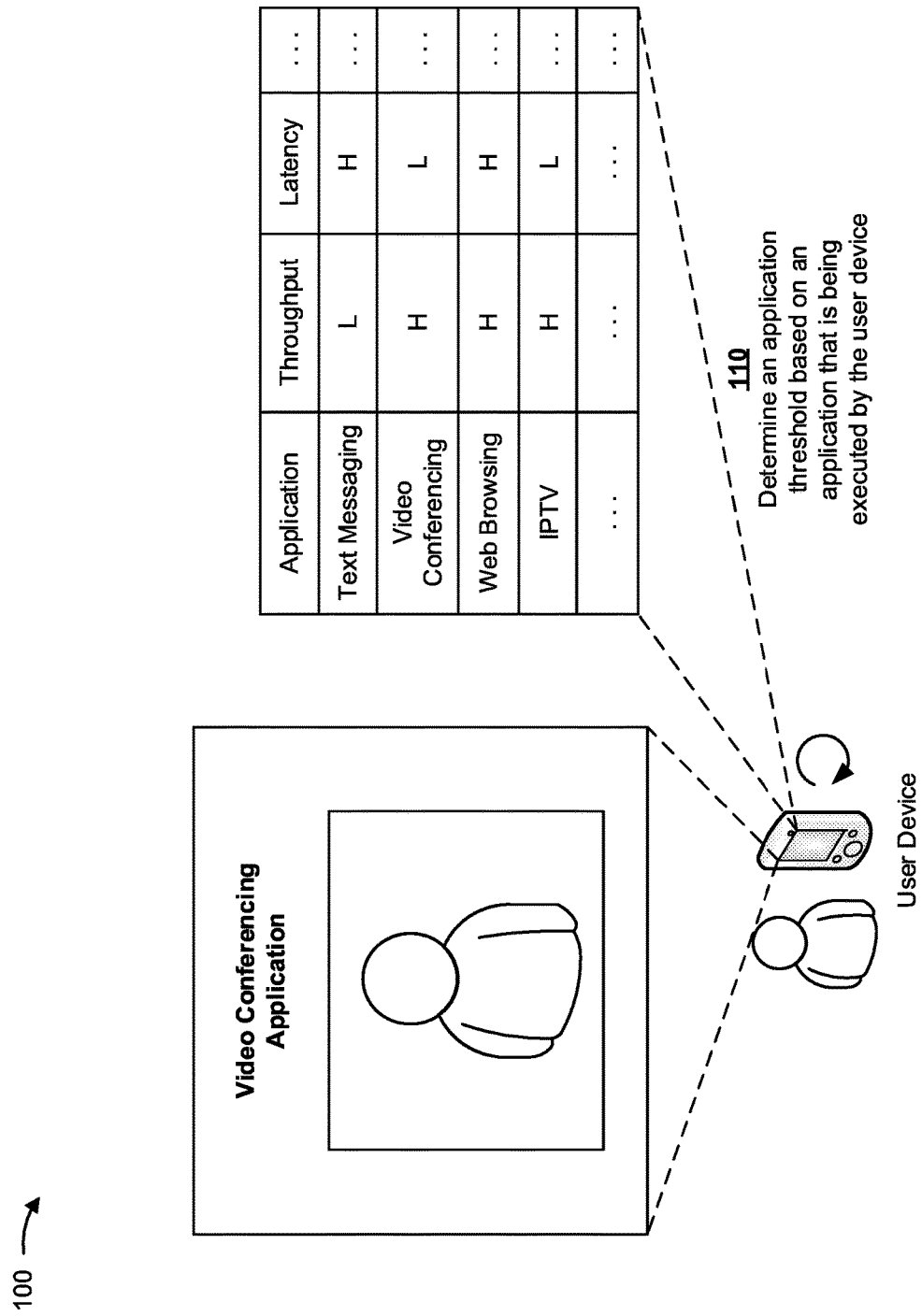

As shown in FIG. 1B, and by reference number 110, the user device may determine an application threshold based on an application that is being executed by the user device (e.g., an active application). For example, the application threshold may be specific to a particular application that is being executed, or is capable of being executed, by the user device. For example, the user device may determine different application thresholds for particular applications, such as a text messaging application, a video conferencing application, a web browsing application, and an Internet Protocol Television (IPTV) application.

As further shown, the application threshold may include one or more thresholds associated with one or more network metric values. For example, as shown, the network metric values may include a throughput value and a latency value. In this case, under "Throughput," "H" indicates a requirement for a high throughput value, and "L" indicates that a lower throughput value may support operation of the application. Similarly, under "Latency," "L" indicates a requirement for a low latency value, while "H" indicates that operation of the application may be supported despite high latency values. While the network metric values are shown in the example figure as "Ls" and "Hs," the network metric values may be expressed in other formats in other implementations (e.g., as other designations, as actual values, or the like).

Figure 1C:
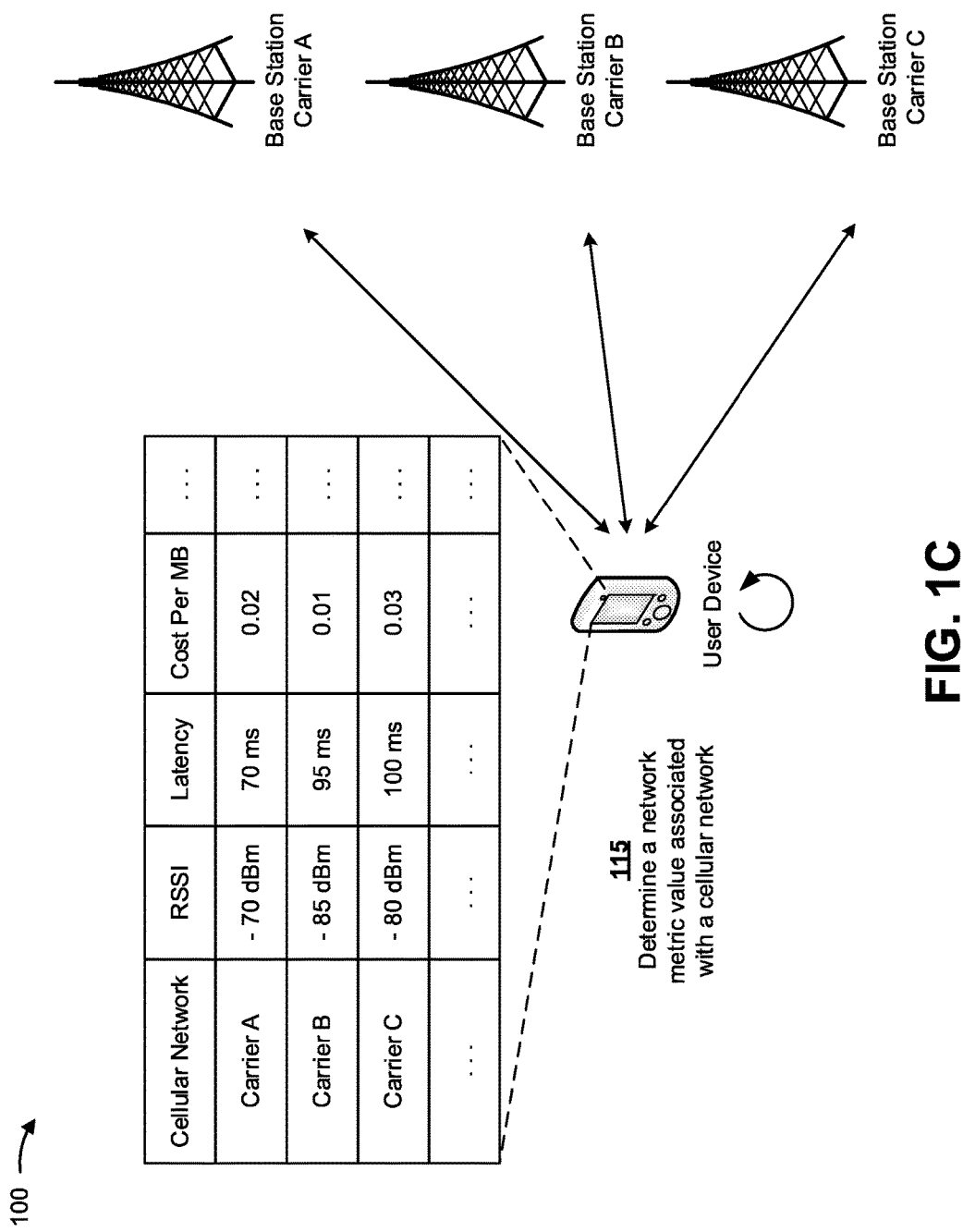

As shown in FIG. 1C, and by reference number 115, the user device may determine a network metric value associated with a cellular network. For example, the user device may determine network metric values for three different cellular networks that are associated with different carriers (e.g., Carrier A, Carrier B, and Carrier C). As shown, the network metric values may include a received signal strength indicator (RSSI) value, a latency value, a throughput value, a jitter value, a bandwidth value, and/or the like. Additionally, the user device may determine data usage cost values associated with the cellular networks (e.g., a cost per megabyte of data, a cost per connection duration, or the like). For example, a data usage cost value may include a monetary amount associated with data usage provided via a particular cellular network.

Figure 1D:
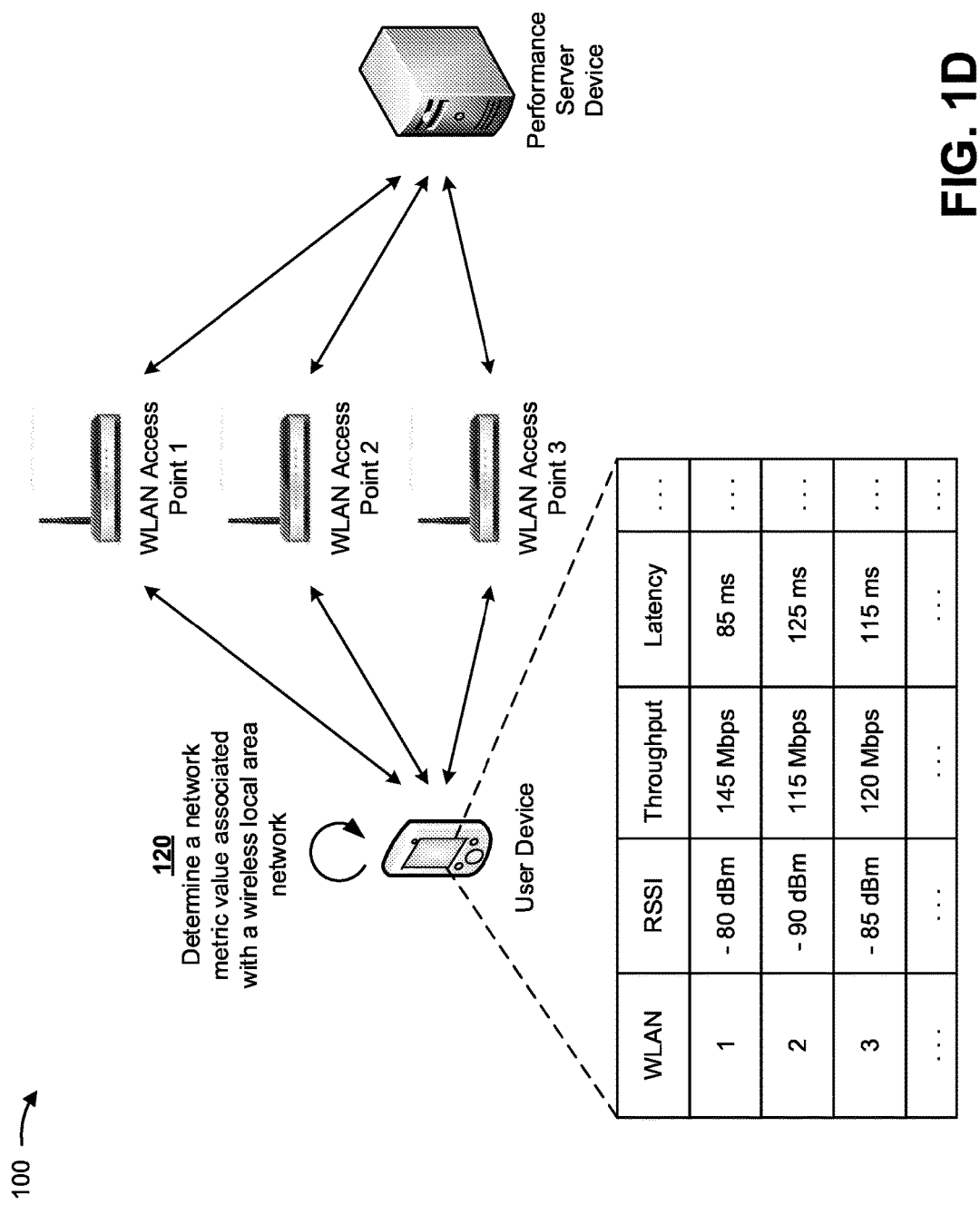

As shown in FIG. 1D, and by reference number 120, the user device may determine a network metric value associated with a WLAN. For example, the user device may determine network metric values for three different WLANs (e.g., WLAN 1, WLAN 2, and WLAN 3). As shown, the network metric values may include an RSSI value, a throughput value, a latency value, and/or the like. As shown, the user device may provide messages to a performance server device via different WLAN access points, receive response messages from the performance server device, and determine the network metric values based on the messages and/or response messages (e.g., measure latency values, throughput values, etc.).

Figure 1E:
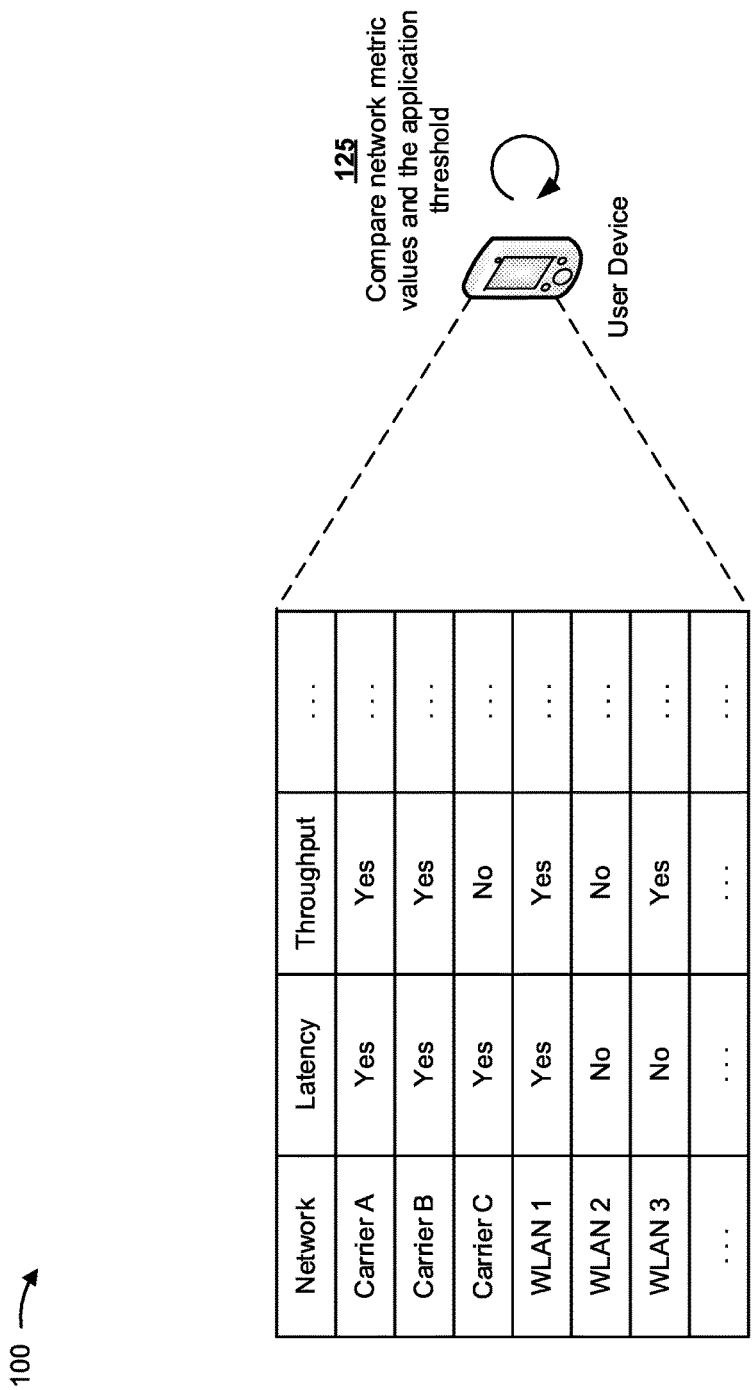

As shown in FIG. 1E, and by reference number 125, the user device may compare network metric values and the application threshold. For example, the user device may compare network metric values, that are associated with respective cellular networks and WLANs, and the application threshold. In this case, "Yes" indicates that a particular access network is associated with a network metric value (or network metric values) that satisfies a corresponding application threshold (e.g., a threshold latency value, threshold throughput value, and/or the like), and "No" indicates that the access network is associated with a network metric value that does not satisfy the corresponding application threshold.

Figure 1F:
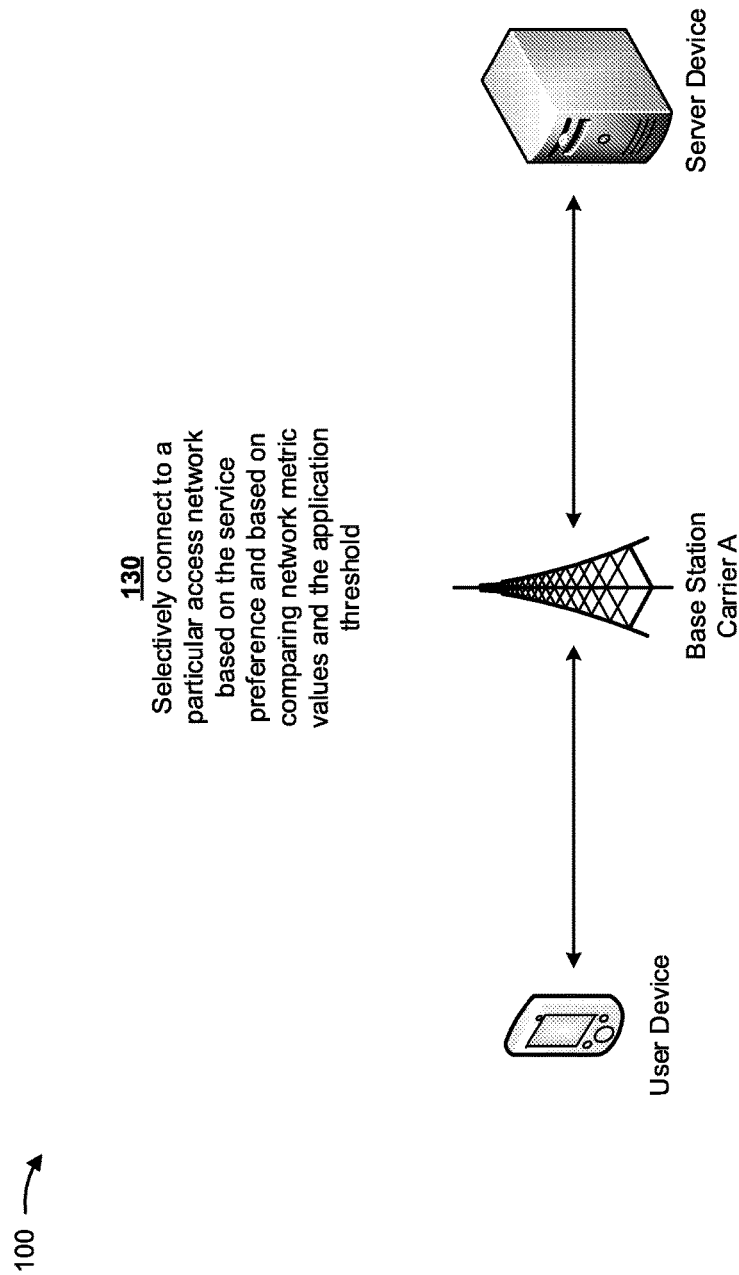

As shown in FIG. 1F, and by reference number 130, the user device may selectively connect to a particular access network based on the service preference and based on comparing network metric values and the application threshold. In this case, the cellular networks associated with Carrier A and Carrier B include network metric values that satisfy the application threshold. Additionally, WLAN 1 includes network metric values that satisfy the application threshold. However, referencing FIG. 1A, the user device may connect to the cellular network associated with Carrier A based on the service preference of "High Performance." For example, assume that the cellular network associated with Carrier A includes the greatest network metric values (e.g., indicating improved operation of the application) as compared to the other available access networks.

Alternatively, as another example, assume that the service preference indicates "Data Cost Minimization." In this case, the user device may select WLAN 1 for connectivity. For example, WLAN 1 includes network metric values that satisfy the application threshold, and data usage associated with WLAN 1 may not be charged against an account of the user (e.g., therefore aligning with a user preference of the user). In some implementations, the user device may monitor network metric values, associated with various access networks, during execution of the application, and may selectively connect to particular access networks based on variations, fluctuations, etc. of the network metric values.

In this way, the user device may receive various inputs (e.g., information that identifies an active application, a threshold throughput value of the active application, a threshold latency value of the active application, cellular network signal quality values, WLAN signal quality values, WLAN network metric values, a service preference, etc.), and determine a particular access network for connectivity based on the various inputs. For example, the user device may include one or more models for determining access network connectivity based on various combinations and/or permutations of inputs.

In this way, the user device may automatically provide connectivity to an access network that is associated with particular network metric values (e.g., that may support operation of the application and/or satisfy the application threshold, that satisfy other network metric values of other networks, or the like), that is associated with a preference of the user, and/or the like. For example, the user device may continuously monitor various inputs (e.g., network metric values associated with cellular networks, and network metric values associated with WLANs), and automatically connect (and/or switch connectivity) based on the various inputs and thresholds. As an example, the user device may switch access network connectivity based on the available access networks and/or metrics associated with the available access networks. In this way, the user device may automatically and continuously compare the available access networks, and selectively connect to a particular access network to minimize a customer's metered data usage, to provide the customer with the strongest signal quality value and/or experience, to provide support for various applications that the user device may execute, or the like.

In this way, implementations described herein reduce communication issues such as packet loss, connection failure, high latency, etc. (e.g., by optimizing a signal quality by switching to an access network that is associated with the strongest available signal quality value, by ensuring that the application that is executing may be supported by the access network, by switching access networks based on a declining signal quality value of a current connection, or the like), reduce an amount of manual switching of connectivity, etc., thereby conserving processor and/or memory resources of the user device and/or network resources. For example, in this way, the user device may reduce a number of packet losses, reduce latency, reduce jitter, reduce the need for the user to interact with the user device to switch access networks, etc.

As indicated above, FIGS. 1A-1F are provided merely as an example. Other examples are possible and may differ from what was described with regard to FIGS. 1A-1F.

Figure 2:
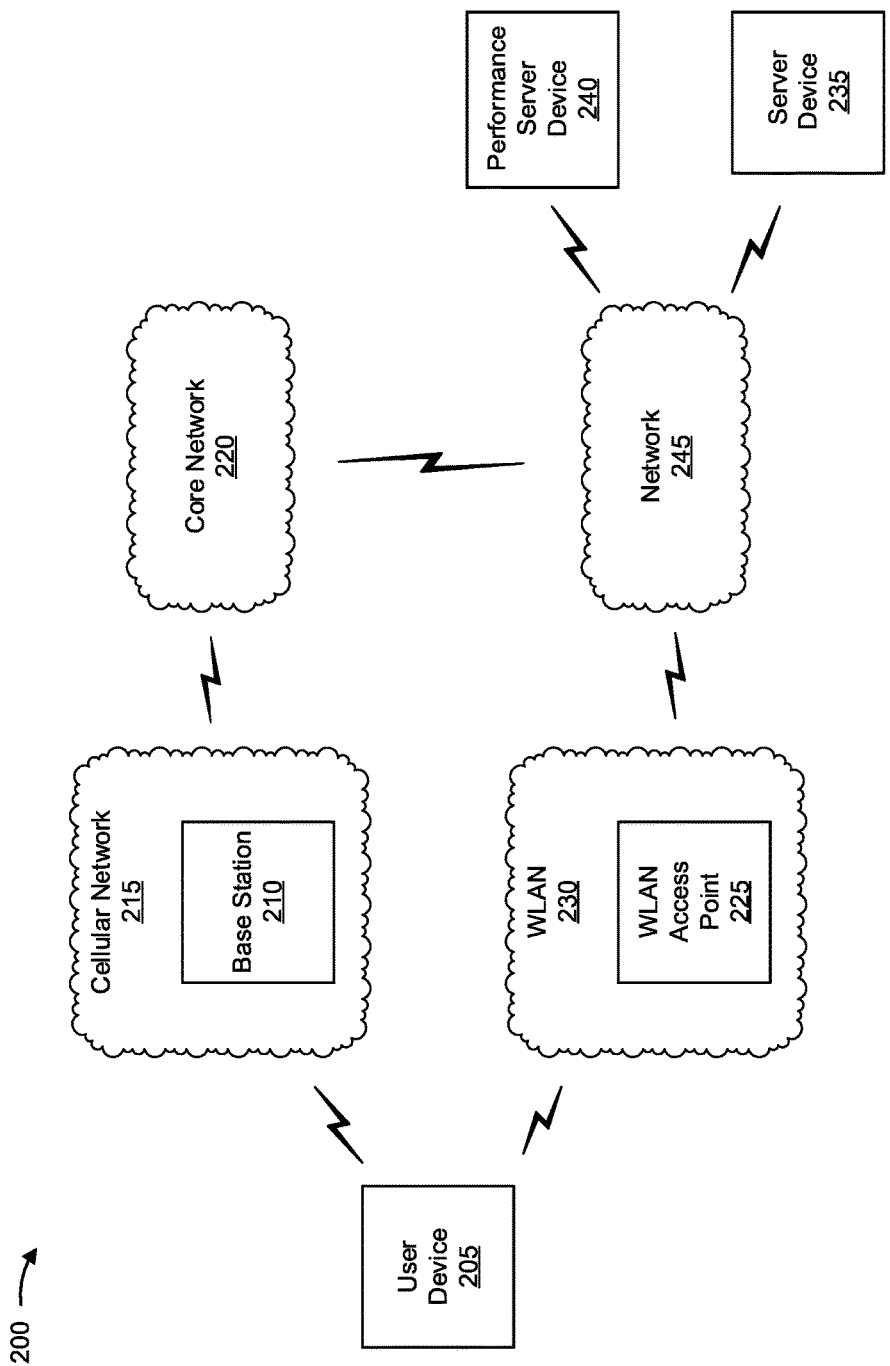
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a cellular network 215, a core network 220, a WLAN access point 225, a WLAN 230, a server device 235, a performance server device 240, and a network 245. Devices of environment 200 may interconnect via wired connections, wireless connections, or a combination of wired and wireless connections.

User device 205 includes one or more devices capable of receiving, generating, storing, processing, and/or providing information associated with an application. For example, user device 205 may include a communication device, such as a mobile phone (e.g., a smart phone or a radiotelephone) a tablet computer, a wearable communication device (e.g., a smart wristwatch or a pair of smart eyeglasses), or a similar type of device. User device 205 may send traffic to and/or receive traffic from cellular network 215 (e.g., via base station 210) and/or WLAN 230 (e.g., via WLAN access point 225).

Base station 210 includes one or more devices capable of transferring traffic, such as audio, video, text, and/or other traffic, destined for and/or received from user device 205. In some implementations, base station 210 may include an evolved Node B (eNB) associated with a long-term evolution (LTE) network. Additionally, or alternatively, base station 210 may be associated with a radio access network (RAN) that is not associated with an LTE network. Base station 210 may send traffic to and/or receive traffic from user device 205 via an air interface. In some implementations, base station 210 may include a small cell base station, such as a base station of a microcell, a picocell, and/or a femtocell.

Cellular network 215 includes one or more networks that utilize a cellular radio access technology, such as an LTE network, a third generation (3G) network, a fourth generation (4G) network, a fifth generation (5G) network, a code division multiple access (CDMA) network, or the like. For example, cellular network 215 may include a RAN that includes one or more base stations 210 via which user device 205 may communicate with core network 220. For example, user device 205 may use cellular network 215 for network access (e.g., to access core network 220 and/or network 245).

Core network 220 includes one or more networks, such as, for example an evolved packet core (EPC) network and/or an IP Multimedia Subsystem (IMS) network. In some implementations, core network 220 may provide connectivity for user device 205 to external packet data networks. In some implementations, core network 220 may be associated with a network operator that manages and/or operates core network 220, such as, for example, a telecommunication service provider, a carrier, a television service provider, an Internet service provider, a wireless service provider, or the like.

WLAN access point 225 includes one or more devices capable of providing access to WLAN 230. For example, WLAN access point 225 may include a router, a gateway, a base station, or another form of access point. In some implementations, WLAN access point 225 may receive, process, and/or transmit data traffic, such as media, audio, video, text, and/or other data traffic, destined for and/or received from user device 205. In some implementations, WLAN access point 225 may employ one or more short-range wireless communication protocols for a wireless personal area network (WPAN) and/or a WLAN, such as, for example, IEEE 802.15 (e.g., Bluetooth) and IEEE 802.11 (e.g., Wi-Fi). In other implementations, different short-range wireless protocols and/or frequencies may be used.

WLAN 230 may include a wireless local area network (e.g., a WLAN). In other implementations, WLAN 230 may be replaced with a wide area network (WAN), a metropolitan area network (MAN), a data network, an ad hoc network, and/or a combination of these or other types of networks.

Server device 235 includes one or more devices capable of providing traffic associated with an application. For example, server device 235 may include a server device (e.g., a host server, a web server, an application server, etc.), a cloud computing device, or a similar device. For example, server device 235 may provide video, audio, images, webpages, text, data, and/or some combination thereof.

Performance server device 240 includes one or more devices capable of receiving, generating, storing, processing, and/or providing information to user device 205. For example, performance server device 240 may include a server device (e.g., a host server, a web server, an application server, etc.), a cloud computing device, or a similar device. In some implementations, user device 205 may provide traffic to performance server device 240, and measure a network metric value based on providing the traffic and/or receiving traffic from performance server device 240.

Network 245 may include one or more wired and/or wireless networks. For example, network 245 may include a WLAN (e.g., a Wi-Fi network), a LAN, a WAN, a MAN, a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
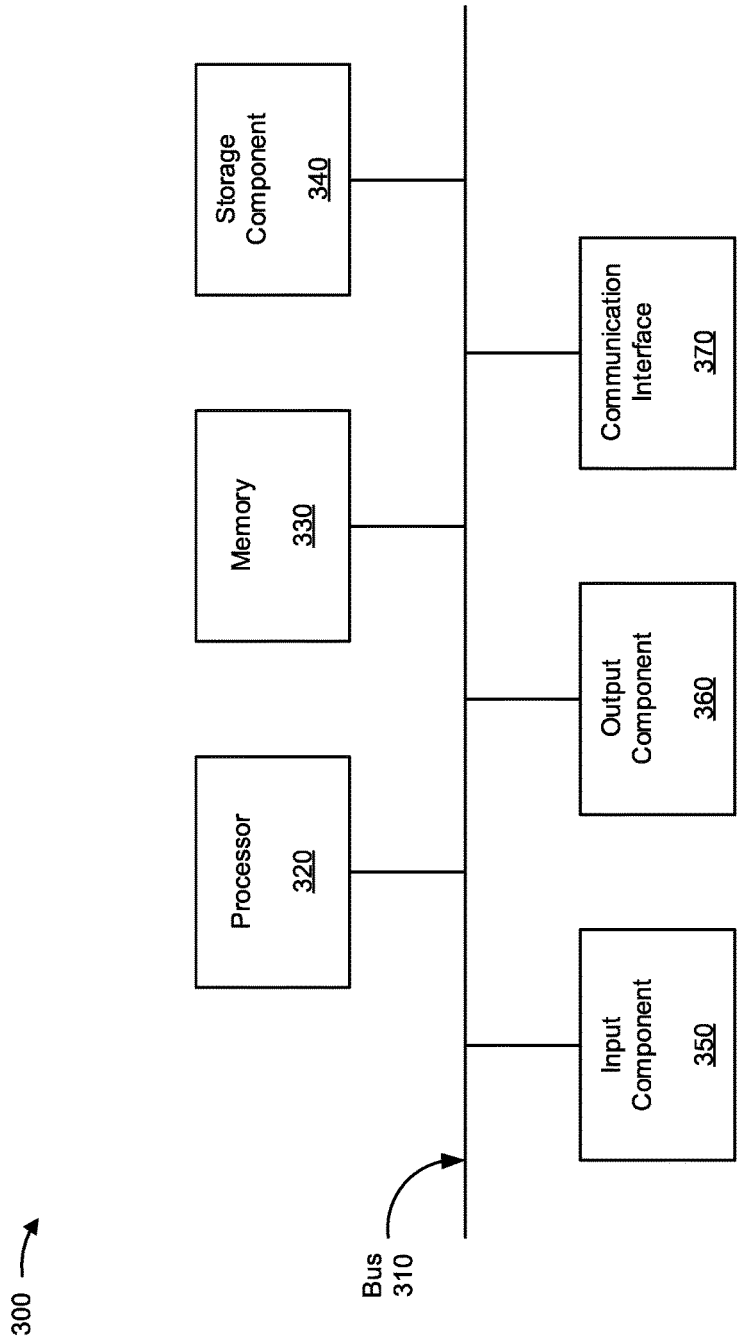
FIG. 3 is a diagram of example components of one or more devices of FIG. 2.

FIG. 3 is a diagram of example components of a device 300. Device 300 may correspond to user device 205, base station 210, WLAN access point 225, server device 235, and/or performance server device 240. In some implementations, user device 205, base station 210, WLAN access point 225, server device 235, and/or performance server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
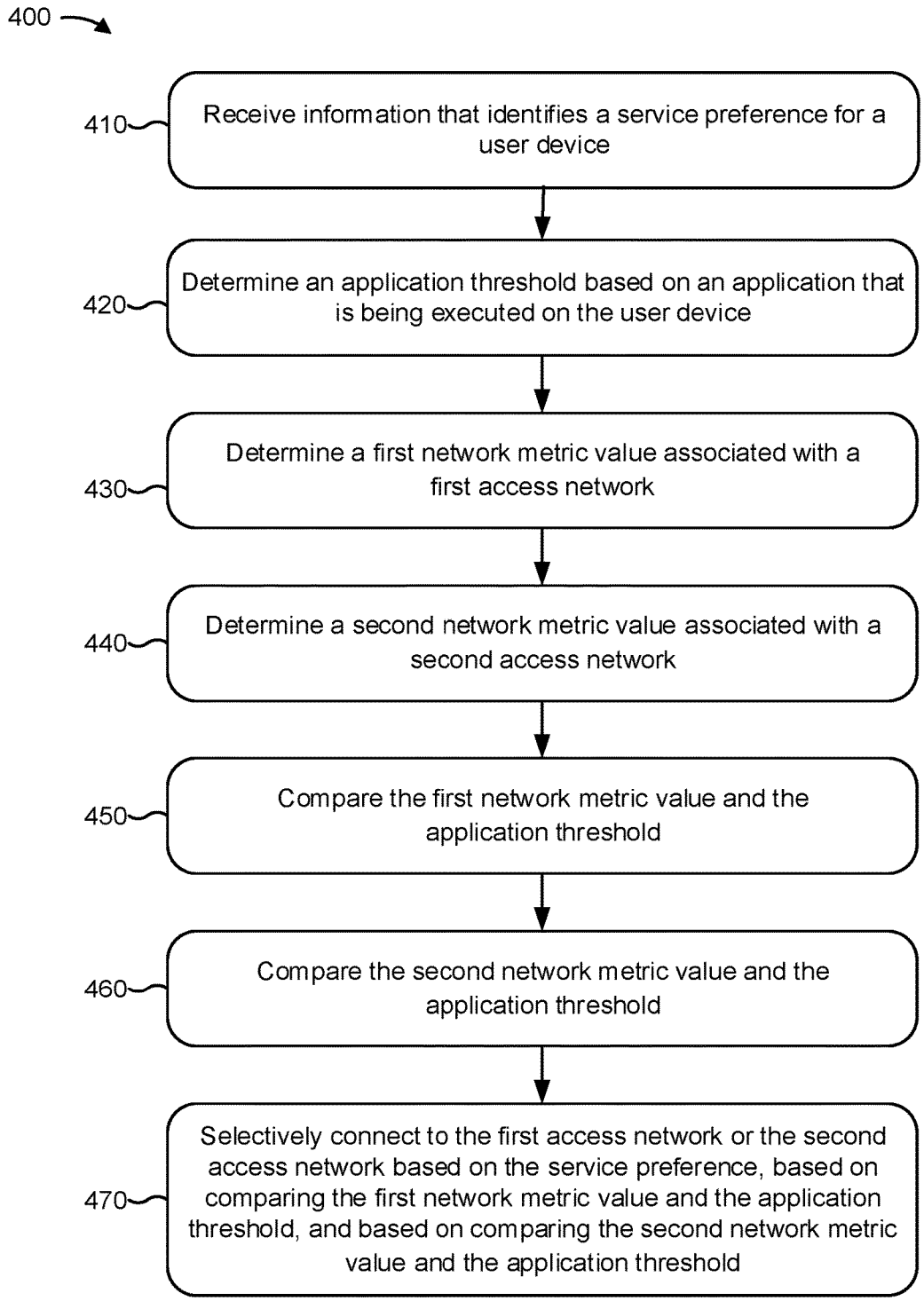
FIG. 4 is a flow chart of an example process for switching access network connectivity based on an application threshold and a service preference.

FIG. 4 is a flow chart of an example process 400 for switching access network connectivity based on an application threshold and a service preference. In some implementations, one or more process blocks of FIG. 4 may be performed by user device 205. In some implementations, one or more process blocks of FIG. 4 may be performed by another device or a group of devices separate from or including user device 205, such as base station 210, WLAN access point 225, server device 235, and/or performance server device 240.

As shown in FIG. 4, process 400 may include receiving information that identifies a service preference for a user device (block 410). For example, user device 205 may receive information that identifies a service preference. In some implementations, a service preference may include information that identifies a preference, of a user of user device 205, regarding a user experience of user device 205. In some implementations, a service preference may include information that identifies a preference, not set by a user of user device 205, regarding a user experience of user device 205. For example, the service preference may be set by a manufacturer of user device 205 or an application capable of being executed by user device 205 or set by an operator of a network with which user device 205 is associated. In some implementations, the service preference may be initially set by the manufacturer or the operator and a user of user device 205 may be permitted to modify the service preference.

The service preference may relate to different metrics relating to operation of user device 205. For example, a first service preference may prioritize a metric such as performance of user device 205 (e.g., prioritize connectivity to an access network that is associated with particular network metric values). As another example, a second service preference may prioritize another metric such as connectivity to WLAN 230 (e.g., to reduce data cost, or the like). In other implementations, other service preferences may prioritize other metrics, combinations of metrics, and/or connectivity to other access networks.

In some implementations, user device 205 may receive information that identifies the service preference based on an input received by user device 205. For example, user device 205 may provide, for display, information that identifies a set of possible service preferences. Continuing with the example, user device 205 may receive, based on an input (e.g., a user interaction, such as a selection, etc.), information that identifies a selection of a service preference from the set of possible service preferences. Additionally, or alternatively, user device 205 may receive, based on an input, information that identifies a ranking of service preferences from the set of possible service preferences.

In this way, user device 205 may connect to a particular access network that more accurately aligns with a user preference, thereby minimizing an amount of manual switching of access network connectivity and thereby conserving processor and/or memory resources of user device 205 and conserving network resources. For example, user device 205 may continuously monitor various input variables associated with available access networks, and automatically connect to a particular access network that aligns with a user preference (e.g., is capable of providing optimized network metric values, is capable of minimizing metered data usage, or the like). Additionally, user device 205 may continuously compare the available access networks, and switch connectivity based on the available access networks and the associated network metric values.

In some implementations, user device 205 may be preconfigured with information that identifies the service preference. In some implementations, user device 205 may receive information that identifies the service preference from an application stored by user device 205. For example, during installation or operation of the application, the application may provide, to user device 205, the information that identifies the service preference. In some implementations, user device 205 may receive information that identifies the service preference from an operator of a network with which user device 205 is associated. For example, the operator may provide, to user device 205, the information that identifies the service preference when user device 205 is connected to the network. In this way, user device 205 may connect to a particular access network that more accurately aligns with an intended access network, thereby minimizing an amount of manual switching of access network connectivity and thereby conserving processor and/or memory resources of user device 205 and conserving network resources.

In some implementations, user device 205 may store a service preference for user device 205 (e.g., that applies to each application capable of being executed by user device 205). Alternatively, user device 205 may store a service preference for each application of user device 205 (e.g., different applications may include different service preferences). Alternatively, user device 205 may store service preferences for different types of applications (e.g., image messaging applications may each include a same service preference).

As further shown in FIG. 4, process 400 may include determining an application threshold based on an application that is being executed by the user device (block 420). For example, user device 205 may determine an application threshold based on an application that is being executed by user device 205. In some implementations, an application threshold may include one or more thresholds associated with one or more network metric values. For example, an application threshold may include information that identifies a particular network metric value that, if satisfied, results in a particular operation of user device 205. In some implementations, user device 205 may determine an application threshold based on application information, as described below. Additionally, or alternatively, user device 205 may determine the application threshold based on a type of application that is being executed by user device 205, based on historical information associated with executing the application (e.g., network metric values that yielded particular performance of the application), or the like.

In some implementations, a network metric value may include a signal quality value. For example, a signal quality value may include a reference signal received power (RSRP) value, a received signal code power (RSCP) value, a received signal strength indicator (RSSI) value, a reference signal received quality (RSRQ) value, a block error rate (BLER) value, a signal-to-interference-plus-noise ratio (SINR) value, a path loss value (e.g., an uplink path loss value or a downlink path loss value), or the like. Additionally, or alternatively, a network metric value may include one or more other measurable values related to network performance. For example, a network metric value may include a bandwidth value, a throughput value, a goodput value, a jitter value, a latency value, an amount of packet losses, a delay value, a round trip time (RTT) value, an amount of retransmissions, or the like.

In some implementations, user device 205 may determine an application threshold based on application information. For example, user device 205 may determine an application threshold associated with a particular application of user device 205. In some implementations, user device 205 may receive application information from another device (e.g., an external server device, or the like), and determine the application threshold based on the application information. In some implementations, the application information may include information that identifies a type of application, information that identifies particular network metric values that are preferred for operation of the application, or the like. As an example, a developer of the application may specify particular network metric values that are preferred for operation of the application.

In some implementations, the application information may include information that identifies whether the application is metered or non-metered. For example, operation of a metered application may result in data usage that is charged against an account of the user of user device 205, whereas operation of a non-metered application may not result in data usage being charged against an account of the user of user device 205. As described elsewhere herein, user device 205 may selectively connect to a particular access network based on an application being metered or non-metered.

In some implementations, user device 205 may determine an application threshold based on performing a technique. For example, user device 205 may use one or more machine learning techniques to analyze data (e.g., training data, such as network metric values associated with historical operation of the application) and create models that determine application thresholds. The techniques may include, for example, supervised and/or unsupervised techniques, such as artificial networks, case-based reasoning, Bayesian statistics, learning automata, Hidden Markov Modeling, linear classifiers, quadratic classifiers, decision trees, association rule learning, or the like. Additionally, or alternatively, user device 205 may use another kind of computer-implemented technique, such as artificial intelligence, machine perception, or computer vision, to analyze data and generate models.

In some implementations, user device 205 may determine different application thresholds for different applications of user device 205. As an example, a first application (e.g., a Voice over Internet Protocol (VoIP) application) may be associated with a different application threshold than as compared to a second application (e.g., a Short Message Service (SMS) application). In this case, the first application may require different network metric values (e.g., a lower latency value, a higher throughput value, etc.) for operation than as compared to the second application.

In some implementations, an application may include multiple application thresholds (e.g., threshold network metric values). For example, an application may include a first application threshold for cellular networks, and a second application threshold for WLANs. Alternatively, as described elsewhere herein, user device 205 may perform a standardization technique in association with network metric values (e.g., associated with different access networks, different types of access networks, etc.), and compare the standardized network metric values and the application threshold.

In some implementations, user device 205 may determine an application threshold for an active application (e.g., an application that is being executed by user device 205 and/or is running in the foreground, or the like). Additionally, as described elsewhere herein, user device 205 may determine network metric values for multiple networks, and connect to a particular network based on the application threshold of the active application. In this way, user device 205 may connect to a particular network that may support operation of the active application, thereby reducing communication issues and conserving processor and/or memory resources of user device 205 and/or network resources. In some implementations, user device 205 may include multiple active applications. In this case, user device 205 may identify respective application thresholds associated with the applications, and compare network metric values and the application thresholds and/or a particular application threshold (e.g., requiring the greatest network metric values, or the like), as described elsewhere herein.

As further shown in FIG. 4, process 400 may include determining a first network metric value associated with a first access network (block 430). For example, user device 205 may determine a first network metric value associated with cellular network 215. In some implementations, user device 205 may receive wireless signals from base station 210, and may determine one or more network metric values, associated with cellular network 215, based on the wireless signals (e.g., may measure an RSSI value, an RSRP value, etc.).

Additionally, or alternatively, user device 205 may perform another technique to determine a network metric value associated with cellular network 215. For example, user device 205 may perform a technique to determine one or more network metric values by providing a message (e.g., a ping message, or the like), requesting a resource, uploading a resource, downloading a resource, etc., to and/or from performance server device 240 or server device 235 via base station 210, or the like. In some implementations, the first network metric value may include multiple network metric values.

As further shown in FIG. 4, process 400 may include determining a second network metric value associated with a second access network (block 440). For example, user device 205 may determine a second network metric value associated with WLAN 230. In some implementations, user device 205 may determine a second network metric value associated with WLAN 230 in a similar manner as described above in connection with block 430. For example, user device 205 may receive wireless signals from WLAN access point 225, provide messages to performance server device 240 via WLAN access point 225, or the like. In some implementations, user device 205 may determine network metric values associated with multiple WLANs 230 that are available for connectivity (e.g., associated with different WLAN access points 225).

In some implementations, the second network metric value may include multiple network metric values. For example, user device 205 may determine multiple network metric values, such as a signal quality value, a latency value, a throughput value, etc. In this way, user device 205 may more accurately estimate a capability of WLAN 230 to support operation of the active application. For example, WLAN 230 may include a signal quality value that satisfies the application threshold, however WLAN 230 may include a latency value and/or a throughput value that does not satisfy the application threshold. As an example, multiple user devices 205 may be connected to WLAN 230, thereby reducing a capability of WLAN 230 to support operation of the active application of user device 205.

In some implementations, the second access network may include a different cellular network 215 than as compared to the first access network. For example, user device 205 may determine network metric values associated with multiple cellular networks 215. For example, a first cellular network 215 may be associated with a first entity (e.g., a carrier, or the like), and a second cellular network 215 may be associated with a second entity (e.g., a different carrier, or the like). In some implementations, different cellular networks 215 may be associated with different data usage cost values. For example, a data usage cost value may include a value per data usage associated with a particular cellular network 215 (e.g., a cost per megabyte of data, a cost per gigabyte of data, etc.). In some implementations, user device 205 may receive, from another device, information that identifies data usage cost values associated with particular cellular networks 215, and selectively connect to a particular cellular network 215 based on a respective data usage cost value, as described elsewhere herein.

While implementations described herein describe selectively connecting to cellular network 215 or WLAN 230, other implementations include other connectivity choices. For example, the first access network may include a first WLAN 230, and the second access network may include a second WLAN 230 (e.g., user device 205 may selectively connect to a particular WLAN 230 because cellular network 215 may not be available for connectivity). Alternatively, the first access network may include a first cellular network 215 and the second access network may include a second cellular network 215 (e.g., user device 205 may selectively connect to a particular cellular network 215 because WLAN 230 may not be available for connectivity).

As further shown in FIG. 4, process 400 may include comparing the first network metric value and the application threshold (block 450). For example, user device 205 may compare the first network metric value (e.g., associated with cellular network 215) and the application threshold. In some implementations, user device 205 may determine whether the first network metric value satisfies the application threshold. As an example, user device 205 may determine whether a throughput value associated with cellular network 215 satisfies a throughput value associated with the application threshold.

Additionally, or alternatively, user device 205 may determine whether multiple network metric values associated with cellular network 215 satisfy values associated with the application threshold (e.g., throughput values, latency values, signal quality values, etc.). In this way, user device 205 may determine whether cellular network 215 may support operation of the application. In some implementations, user device 205 may determine whether a threshold amount of network metric values satisfy the application threshold. For example, a first set of network metric values may satisfy the application threshold, whereas a second set of network metric values may not satisfy the application threshold. In this case, user device 205 may determine whether cellular network 215 may support operation of the application based on the amount of network metric values that satisfy the application threshold, based on the amount of network metric values that do not satisfy the application threshold, or the like.

As further shown in FIG. 4, process 400 may include comparing the second network metric value and the application threshold (block 460). For example, user device 205 may compare the second network metric value and the application threshold. In some implementations, user device 205 may compare the second network metric value and the application threshold in a similar manner as described above in connection with block 450. In this way, user device 205 may determine whether WLAN 230 may support operation of the application, and selectively connect to either cellular network 215 or WLAN 230 (or another access network) based on the service preference, as described below.

As further shown in FIG. 4, process 400 may include selectively connecting to the first access network or the second access network based on the service preference, based on comparing the first network metric value and the application threshold, and based on comparing the second network metric value and the application threshold (block 470). For example, user device 205 may selectively connect to a particular cellular network 215 or a particular WLAN 230 based on the service preference, based on comparing the first network metric value and the application threshold, and/or based on comparing the second network metric value and the application threshold.

In some implementations, user device 205 may store one or more models, and may determine an access network for connectivity based on the one or more models. For example, user device 205 may receive and/or determine one or more inputs to the model (e.g., the application threshold, network metric values, the service preference, etc.), and determine an access network for connectivity based on the model. In this way, user device 205 may connect to a particular access network based on multiple inputs, thereby connecting to an access network that may support operation of the application, may align with a service preference of the user, etc.

As an example, in a first scenario, a service preference may identify a preference for "high quality," "high performance," "improved signal strength," "optimized service," etc. In some implementations, and in association with the first scenario, multiple access networks may include network metric values that satisfy the application threshold. In such cases, user device 205 may connect to a particular access network that is associated with the greatest network metric value(s), that is associated with the most network metric values that satisfy particular application thresholds, or the like. In some implementations, user device 205 may perform a technique, such as a standardization technique, a normalization technique, etc., to adjust network metric values such that network metric values may be compared inter-networks (e.g., between cellular network 215 and WLAN 230, between a first cellular network 215 and a second cellular network 215, between a first WLAN 230 and a second WLAN 230, etc.).

As another example, in a second scenario, the service preference may identify "data cost minimization," "Wi-Fi preferred," etc. In a first variation of the second scenario, cellular network 215 and WLAN 230 may both include network metric values that satisfy the application threshold. In this case, user device 205 may connect to WLAN 230 given the service preference identifying "data cost minimization." In a second variation of the second scenario, one or more cellular networks 215 may include network metric values that satisfy the application threshold, and WLAN 230 may not include a network metric value that satisfies the application threshold. In this case, user device 205 may determine a particular cellular network 215 (e.g., associated with a lowest data usage cost value, or the like) and select the particular cellular network 215 for connectivity (e.g., to more accurately align with the service preference). In some implementations, if the application includes a non-metered application, then user device 205 may select, for connectivity, an access network that is associated with the greatest network metric values (e.g., regardless of the service preference).

As another example, in a third scenario, user device 205 may selectively connect to a particular access network based on a ranking of the service preferences. For example, a user may interact with user device 205 to rank service preferences (e.g., indicate a preference for "high performance" over "data cost minimization" over another service preference, etc.). In this way, user device 205 may connect to a particular access network that more accurately aligns with a preference of a user. Additionally, as described below in connection with FIGS. 5A and 5B, user device 205 may continuously monitor network metric values associated with available access networks, and automatically switch connectivity between the available access networks based on performing operations similar as described above in connection with blocks 410 through 470. In this way, user device 205 may automatically connect to a particular access network based on current conditions and/or real time information associated with available access networks.

While some connectivity scenarios and/or variations are described herein for example purposes, it should be understood that other implementations may include different connectivity results based on various combinations of conditions and/or that the example connectivity scenarios may include different connectivity results. Implementations described herein enable user device 205 to connect to a particular access network that is capable of providing operation of the application, that more accurately aligns to a user's preference, and/or the like. In this way, implementations described herein reduce communication issues and reduce an amount of manual switching of access network connectivity, thereby conserving processor and/or memory resources of user device 205 and/or network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a user device to receive information that identifies a service preference, such as information that identifies a preference for particular network metric values, a preference for connectivity to a particular access network, or the like. Additionally, implementations described herein enable a user device to determine an application threshold associated with an application that is being executed by the user device (e.g., minimum network metric values for operation of the application without communication issues). Additionally, implementations described herein enable the user device to determine network metric values associated with multiple access networks (e.g., cellular networks, WLANs, etc.), and connect to a particular access network based on particular network metric values, the service preference, and/or the application threshold.

In this way, the user device may automatically provide connectivity to an access network that is associated with particular network metric values (e.g., that satisfy the application threshold, that satisfy other network metric values of other access networks, or the like), that is associated with a preference of the user, and/or the like. In this way, implementations described herein reduce communication issues (e.g., failed connections, packet losses, latency, etc.). For example, the user device may optimize a signal quality value (e.g., connect to the access network that is associated with the strongest available signal), may switch from an access network that is associated with declining metrics (e.g., is incapable of providing adequate service), may switch to an access network that is associated with improved metrics, etc.

Additionally, implementations described herein eliminate a need for manual switching of connectivity. For example, the user device may continuously monitor various inputs and automatically switch access network connectivity based on the inputs and various thresholds (e.g., optimizing signal quality by connecting to an available access network that is associated with the greatest metrics, by minimizing metered data usage, or the like). Thereby, implementations described herein eliminate the need for a user to manually interact with the user device to switch connectivity.

In this way, implementations described herein enable the user device to connect to particular access networks that may support operation of the application that is being executed by the user device (e.g., improve throughput, reduce latency, minimize download times, etc.), thereby conserving processor and/or memory resources of the user device and/or network resources. For example, implementations described herein enable the user device to refrain from connecting to access networks that may not support operation of the application.

Figure 5A:
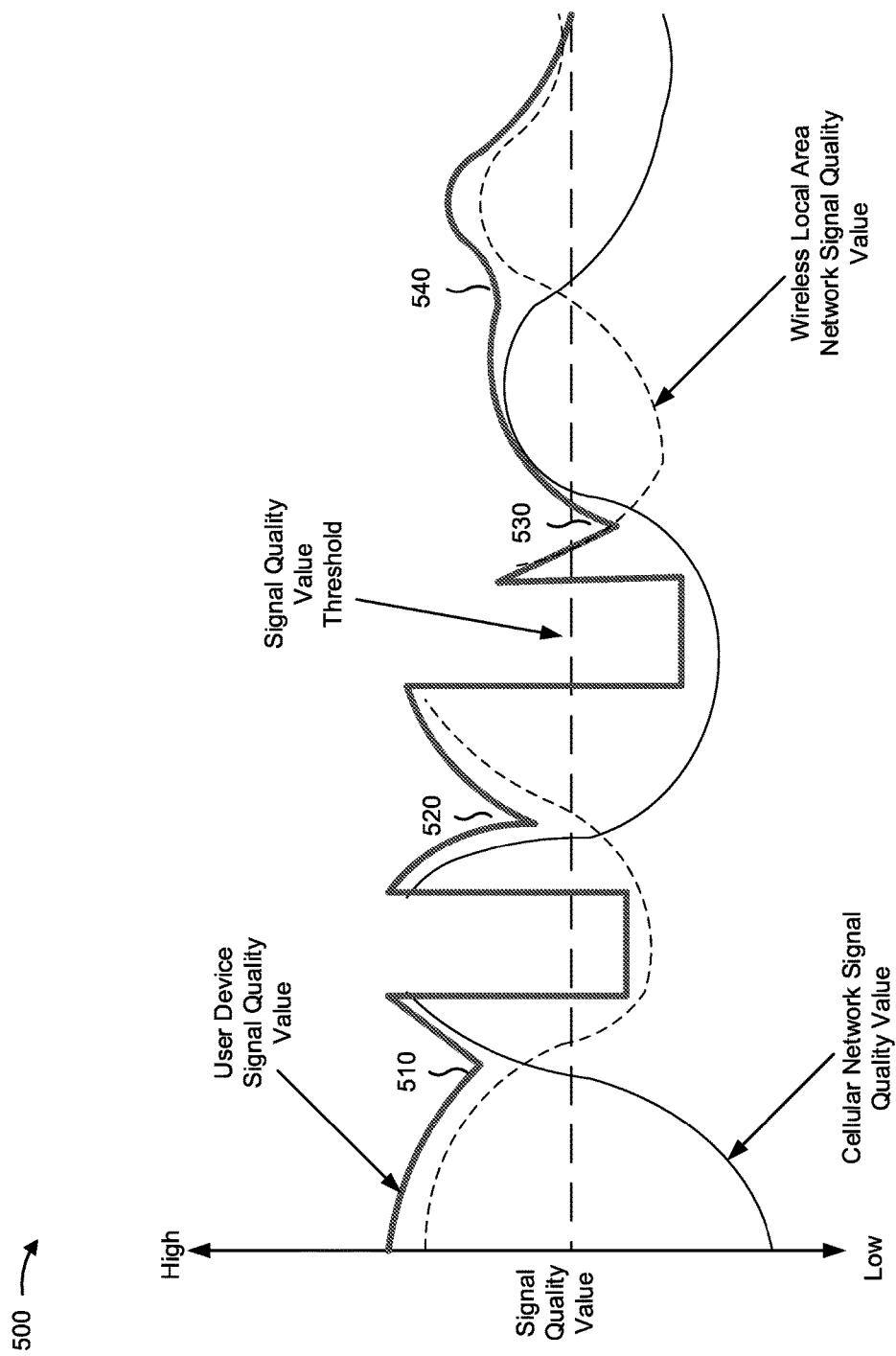
FIGS. 5A and 5B are diagrams of example plots of a user device signal quality value based on automatically switching access network connectivity.
Figure 5B:
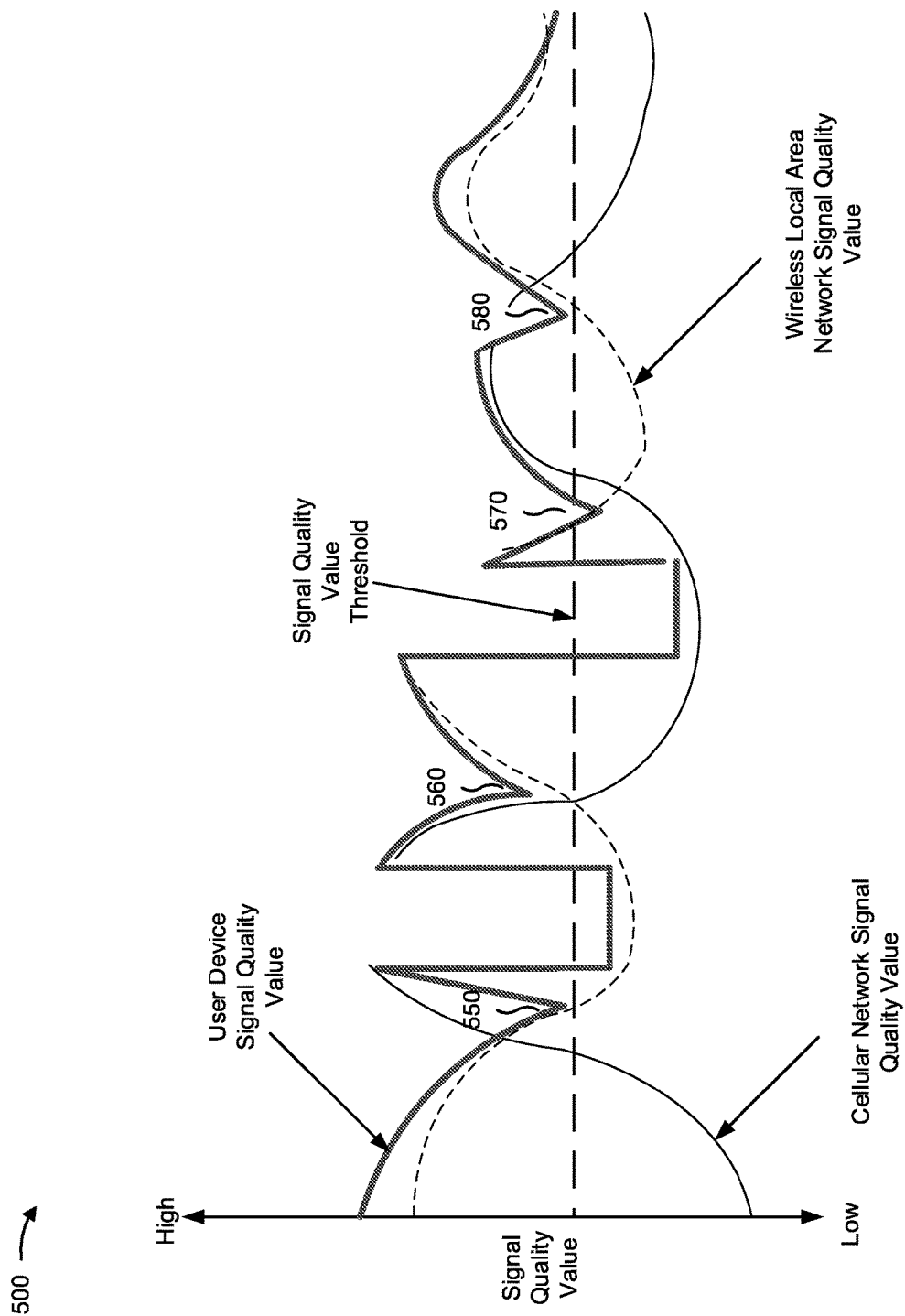

FIGS. 5A and 5B are diagrams of example plots of a user device signal quality value based on automatically switching access network connectivity. For example, FIGS. 5A and 5B includes plots of a signal quality value of cellular network 215, a signal quality value of WLAN 230, and a signal quality value of user device 205 for a time frame.

As shown in FIG. 5A, assume that a service preference is indicative of a preference for an optimized signal quality value of user device 205. For example, the user may interact with user device 205 to specify a preference that user device 205 automatically connect to an access network associated with the strongest signal quality value. As shown in FIG. 5A, the signal quality value threshold may be representative of the service preference, an application threshold, and/or a combination thereof (e.g., user device 205 may determine the signal quality value threshold based on the application threshold and the service preference).

As shown in FIG. 5A, and by reference number 510, user device 205 may determine that a signal quality value of cellular network 215 is greater than a signal quality value of WLAN 230, and automatically switch connectivity from WLAN 230 to cellular network 215. As shown, user device 205 may automatically switch connectivity to WLAN 230 based on an unavailability of cellular network 215.

As shown by reference number 520, user device 205 may determine that a signal quality value associated with WLAN 230 is greater than a signal quality value of cellular network 215, and automatically switch connectivity to WLAN 230. As shown, user device 205 may automatically switch connectivity to cellular network 215 based on an unavailability of WLAN 230.

As shown by reference number 530, user device 205 may determine that a signal quality value of cellular network 215 is greater than a signal quality value of WLAN 230, and automatically switch connectivity to cellular network 215. As shown by reference number 540, user device 205 may determine that a signal quality value associated with WLAN 230 is greater than a signal quality value associated with cellular network 215, and automatically switch connectivity to WLAN 230.

In this way, as shown in FIG. 5A, user device 205 may continuously monitor signal quality values associated with available access networks, and automatically switch connectivity between access networks based on the signal quality values. That is, user device 205 may automatically connect to an access network associated with the strongest available signal quality value, thereby providing the user with an optimized user experience (e.g., improved performance, quicker download times, etc.). While signal quality values associated with two access networks are shown in FIG. 5A, it should be understood that user device 205 may continuously monitor signal quality values associated with multiple access networks and/or types of access networks, and switch connectivity, of user device 205, between the access networks based on the signal quality values, and the signal quality value threshold. Also, while signal quality values are shown in FIGS. 5A and 5B, it should be understood that user device 205 may additionally monitor other types of network metric values associated with the available access networks, and automatically switch connectivity based on the network metric values.

As shown in FIG. 5B, assume that a service preference is indicative of a preference for metered data usage minimization. For example, the user may interact with user device 205 to specify a preference that user device 205 connect to WLAN 230. As shown in FIG. 5B, the signal quality value threshold may be representative of the service preference and an application threshold.

As shown by reference number 550, user device 205 may determine that a signal quality value associated with WLAN 230 is less than the signal quality value threshold, and automatically switch connectivity to cellular network 215. As shown, at a time before user device 205 automatically switches from WLAN 230 to cellular network 215, a signal quality value of cellular network 215 is greater than WLAN 230. Notwithstanding, user device 205 remains connected to WLAN 230 based on the service preference.

As shown by reference number 560, user device 205 may determine that a signal quality value of WLAN 230 is greater than the signal quality value threshold, and automatically switch connectivity from cellular network 215 to WLAN 230.

As shown by reference number 570, user device 205 may determine that a signal quality value of WLAN 230 is less than the signal quality value threshold, and automatically switch connectivity from WLAN 230 to cellular network 215. In some implementations, user device 205 may determine that both WLAN 230 and cellular network 215 are associated with signal quality values that are less than the signal quality value threshold, and remain connected to WLAN 230.

As shown by reference number 580, user device 205 may determine that a signal quality value of WLAN 230 is greater than the signal quality value threshold, and automatically switch connectivity from cellular network 215 to WLAN 230.

In this way, user device 205 may compare a signal quality value of WLAN 230 and a signal quality value threshold, and determine whether the signal quality of WLAN 230 satisfies the signal quality value threshold. In cases where the signal quality value of WLAN 230 does satisfy the signal quality value threshold, user device 205 may remain connected to WLAN 230 (e.g., to minimize metered data usage based on the service preference).

As indicated above, FIGS. 5A and 5B are provided merely as an example. Other examples are possible and may differ from what was described with regard to FIGS. 5A and 5B. While a particular series of access network connectivity selections have been described above with regard to FIGS. 5A and 5B, other implementations include other access network connectivity selections.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
one or more memories; and
one or more processors, communicatively coupled to the one or more memories, to:
provide, for display via a user interface of the user device, a set of available service preferences for selection by a user of the user device;
receive information that identifies a service preference of the set of available service preferences for the user device,
the service preference being selected via the user interface of the user device;
determine an application threshold based on an application that is being executed by the user device,
the application threshold being associated with one or more network metric values,
the one or more network metric values including a throughput value and a latency value,
the throughput value being indicated as a high throughput value or low throughput value for the application, and
the latency value being indicated as a high latency value or a low latency value for the application;
determine first network metric values associated with a cellular network;
determine second network metric values associated with a wireless local area network; and
automatically switch connectivity, of the user device, between the cellular network and the wireless local area network based on the service preference, the application threshold, the first network metric values, and the second network metric values.

2. The user device of claim 1, where the one or more processors are further to:
determine that the first network metric values are greater than the second network metric values; and
where the one or more processors, when automatically switching connectivity, of the user device, between the cellular network and the wireless local area network, are to:
automatically switch connectivity, of the user device, from the wireless local area network to the cellular network based on the first network metric values being greater than the second network metric values, the service preference being indicative of a preference for optimized signal quality value.

3. The user device of claim 1, where the one or more processors are further to:
   determine that the second network metric values satisfy the application threshold; and
   where the one or more processors, when automatically switching connectivity, of the user device, between the cellular network and the wireless local area network, are to:
      automatically switch connectivity, of the user device, from the cellular network to the wireless local area network based on the second network metric values satisfying the application threshold.

4. The user device of claim 1, where the one or more processors are further to:
   determine that the second network metric values satisfy the application threshold; and
   where the one or more processors, when automatically switching connectivity, of the user device, between the cellular network and the wireless local area network, are to:
      automatically switch connectivity, of the user device, from the cellular network to the wireless local area network based on the second network metric values satisfying the application threshold and based on the service preference.

5. The user device of claim 1, where the one or more processors are further to:
   determine a data usage cost value associated with the cellular network;
   determine another data usage cost value associated with another cellular network; and
   where the one or more processors, when automatically switching connectivity, of the user device, between the cellular network and the wireless local area network, are to:
      switch connectivity from the cellular network to the other cellular network based on the data usage cost value and the other data usage cost value.

6. The user device of claim 1, where the set of available service preferences are to be applied to all applications that are capable of being executed by the user device.

7. The user device of claim 1, where the set of available service preferences includes a first set of available service preferences and a second set of available service preferences different from the first set of available service preferences,
   the first set of available service preferences to be applied to a first set of applications that are capable of being executed by the user device, and
   the second set of available service preferences to be applied to a second set of applications that are capable of being executed by the user device,
      the first set of applications being different than the second set of applications.

8. A non-transitory computer-readable medium storing instructions, the instructions comprising:
   one or more instructions that, when executed by one or more processors of a user device, cause the one or more processors to:
      provide, for display via a user interface of the user device, a set of available service preferences for selection by a user of the user device;
      receive information that identifies a service preference of the set of available service preferences for the user device,
         the service preference being selected via the user interface of the user device;
      determine an application threshold based on an application that is being executed by the user device,
         the application threshold being associated with one or more network metric values,
            the one or more network metric values including a throughput value and a latency value,
               the throughput value being indicated as a high throughput value or low throughput value for the application, and
               the latency value being indicated as a high latency value or a low latency value for the application;
      determine first network metric values associated with a first access network;
      determine second network metric values associated with a second access network; and
      automatically switch connectivity, of the user device, between the first access network and the second access network based on the service preference, the application threshold, the first network metric values, and the second network metric values.

9. The non-transitory computer-readable medium of claim 8, where the first access network is a cellular network and where the second access network is a wireless local area network.

10. The non-transitory computer-readable medium of claim 8, where the one or more instructions, when executed by the one or more processors, further cause the one or more processors to:
    determine that the first network metric values are greater than the second network metric values; and
    where the one or more instructions, that cause the one or more processors to automatically switch connectivity, cause the one or more processors to:
       automatically switch connectivity, of the user device, from the second access network to the first access network based on the first network metric values being greater than the second network metric values.

11. The non-transitory computer-readable medium of claim 8, where the one or more instructions, when executed by the one or more processors, further cause the one or more processors to:
    determine that the second network metric values satisfy the application threshold; and
    where the one or more instructions, that cause the one or more processors to automatically switch connectivity, cause the one or more processors to:
       automatically switch connectivity, of the user device, from the first access network to the second access network based on the second network metric values satisfying the application threshold.

12. The non-transitory computer-readable medium of claim 8, where the first access network is a first cellular network and where the second access network is a second cellular network,
    the first cellular network and the second cellular network being associated with different carriers.

13. The non-transitory computer-readable medium of claim 8, where the set of available service preferences includes a first set of available service preferences and a second set of available service preferences different from the first set of available service preferences, the first set of available service preferences to be applied to a first type of application that is capable of being executed by the user device, and the second set of available service preferences to be applied to a second type of application that is capable of being executed by the user device, the first type of application being different than the second type of application.

14. The non-transitory computer-readable medium of claim 8, where the one or more network metric values further include at least one of:

a bandwidth value;

a good put value;

a jitter value;

an amount of packet loss;

a delay value;

a round trip time (RTT) value; or an amount of retransmissions.

15. A method, comprising:

providing, by a user device and for display via a user interface of the user device, a set of available service preferences for selection by a user of the user device;

receiving, by the user device, information that identifies a service preference, of the set of available service preferences, for the user device, the service preference being selectable via the user interface of the user device;

determining, by the user device, an application threshold based on an application that is being executed by the user device, the application threshold being associated with one or more network metric values, the one or more network metric values including a throughput value and a latency value, the throughput value being indicated as a high throughput value or low throughput value for the application, and the latency value being indicated as a high latency value or a low latency value for the application;

determining, by the user device, first network metric values associated with a cellular network;

determining, by the user device, second network metric values associated with a wireless local area network; and automatically switching, by the user device, connectivity, of the user device, between the cellular network and the wireless local area network based on the service preference, the application threshold, the first network metric values, and the second network metric values.

16. The method of claim 15, further comprising:

determining that the first network metric values are greater than the second network metric values; and where automatically switching connectivity comprises:

automatically switching connectivity from the wireless local area network to the cellular network based on the first network metric values being greater than the second network metric values.

17. The method of claim 15, further comprising:

determining that the second network metric values satisfy the application threshold; and where automatically switching connectivity comprises:

automatically switching connectivity from the cellular network to the wireless local area network based on the second network metric values satisfying the application threshold and based on the service preference.

18. The method of claim 15, further comprising:

storing information identifying a set of application thresholds based on a set of applications of the user device; and where determining the application threshold comprises:

determining the application threshold based on the set of application thresholds.

19. The method of claim 15, further comprising:

determining a data usage cost value associated with the cellular network;

determining another data usage cost value associated with another cellular network; and where automatically switching connectivity comprises:

automatically switching connectivity from the cellular network to the other cellular network based on the data usage cost value and the other data usage cost value.

20. The method of claim 15, where the set of available service preferences includes a first set of available service preferences and a second set of available service preferences different from the first set of available service preferences, the first set of available service preferences to be applied to a first set of applications that are capable of being executed by the user device, and the second set of available service preferences to be applied to a second set of applications that are capable of being executed by the user device, the first set of applications being different than the second set of applications.

* * * * *